United States Patent
Raj et al.

(10) Patent No.: US 10,791,468 B2
(45) Date of Patent: Sep. 29, 2020

(54) SYSTEM AND METHOD FOR CELL PLACEMENT USING END-USER-DEVICE SCORING

(71) Applicant: Verizon Patent and Licensing Inc., Arlington, VA (US)

(72) Inventors: Michael Antony Raj, Basking Ridge, NJ (US); Joshua H. Wainer, Bridgewater, NJ (US); Paul Kerl, East Arlington, MA (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 117 days.

(21) Appl. No.: 16/133,081

(22) Filed: Sep. 17, 2018

(65) Prior Publication Data
US 2020/0092732 A1    Mar. 19, 2020

(51) Int. Cl.
| | |
|---|---|
| *H04W 16/18* | (2009.01) |
| *H04W 16/22* | (2009.01) |
| *H04W 88/08* | (2009.01) |
| *H04W 24/02* | (2009.01) |
| *H04W 24/10* | (2009.01) |
| *H04W 24/08* | (2009.01) |
| *G06F 16/2457* | (2019.01) |

(52) U.S. Cl.
CPC .......... *H04W 16/18* (2013.01); *H04W 16/22* (2013.01); *H04W 24/02* (2013.01); *H04W 24/08* (2013.01); *H04W 24/10* (2013.01); *H04W 88/08* (2013.01); *G06F 16/24578* (2019.01)

(58) Field of Classification Search
None
See application file for complete search history.

(56) References Cited

U.S. PATENT DOCUMENTS

| | | | |
|---|---|---|---|
| 9,432,901 B1 * | 8/2016 | Kwan | H04L 41/147 |
| 2009/0143064 A1 * | 6/2009 | Bernini | H04W 16/18 |
| | | | 455/423 |
| 2015/0087321 A1 * | 3/2015 | Scherzer | H04W 16/18 |
| | | | 455/446 |
| 2016/0066201 A1 * | 3/2016 | Kerpez | H04W 24/02 |
| | | | 370/252 |
| 2016/0157114 A1 * | 6/2016 | Kalderen | H04W 24/08 |
| | | | 370/252 |
| 2018/0332557 A1 * | 11/2018 | Vuornos | H04W 64/006 |

* cited by examiner

*Primary Examiner* — Jutai Kao

(57) ABSTRACT

A system determines an optimized number and placement of wireless stations based on predicted future demand scoring of end user devices. A computing device calculates a growth projection of mobile devices in a geographic region for a time period; calculates a visiting projection for a peak amount of mobile devices connected to wireless stations in the geographic area and their locations when connected to wireless stations within the time period; calculates an application-use projection for bandwidth use patterns of the mobile devices within the time period; and calculates a network impact projection for an amount bandwidth impact by the mobile devices at each of the wireless stations. The computing device generates a demand score for geographic units within the geographic region, based on the projections, and assigns, based on the demand score, one or more of the geographic units as placement locations for new wireless station during the time period.

20 Claims, 7 Drawing Sheets

SYSTEM AND METHOD FOR CELL PLACEMENT USING END-USER-DEVICE SCORING

BACKGROUND

Mobile devices connect to an access network via a wireless station, which may be referred to as an access point, a base station, a node, etc. A wireless station may include a radio frequency (RF) transceiver for a Radio Access Network (RAN) configured to receive wireless signals from a mobile communication device and to transmit wireless signals to the mobile communication device.

The design and implementation of next generation wireless networks (e.g., 3GPP Fifth Generation (5G) networks) is currently underway. 5G networks, for example, may use different frequencies, different radio access technologies, and different core network functions that can provide an improved user experience over current or legacy wireless networks (e.g., 3G and 4G networks). As part of the transition to 5G network technology, wireless stations supporting 5G standards are being added to existing 4G coverage areas. Network service providers may seek to maximize the value of wireless stations and other network components by optimizing use of existing RF resources, such as wireless station components.

DETAILED DESCRIPTION OF PREFERRED EMBODIMENTS

Figure 1:
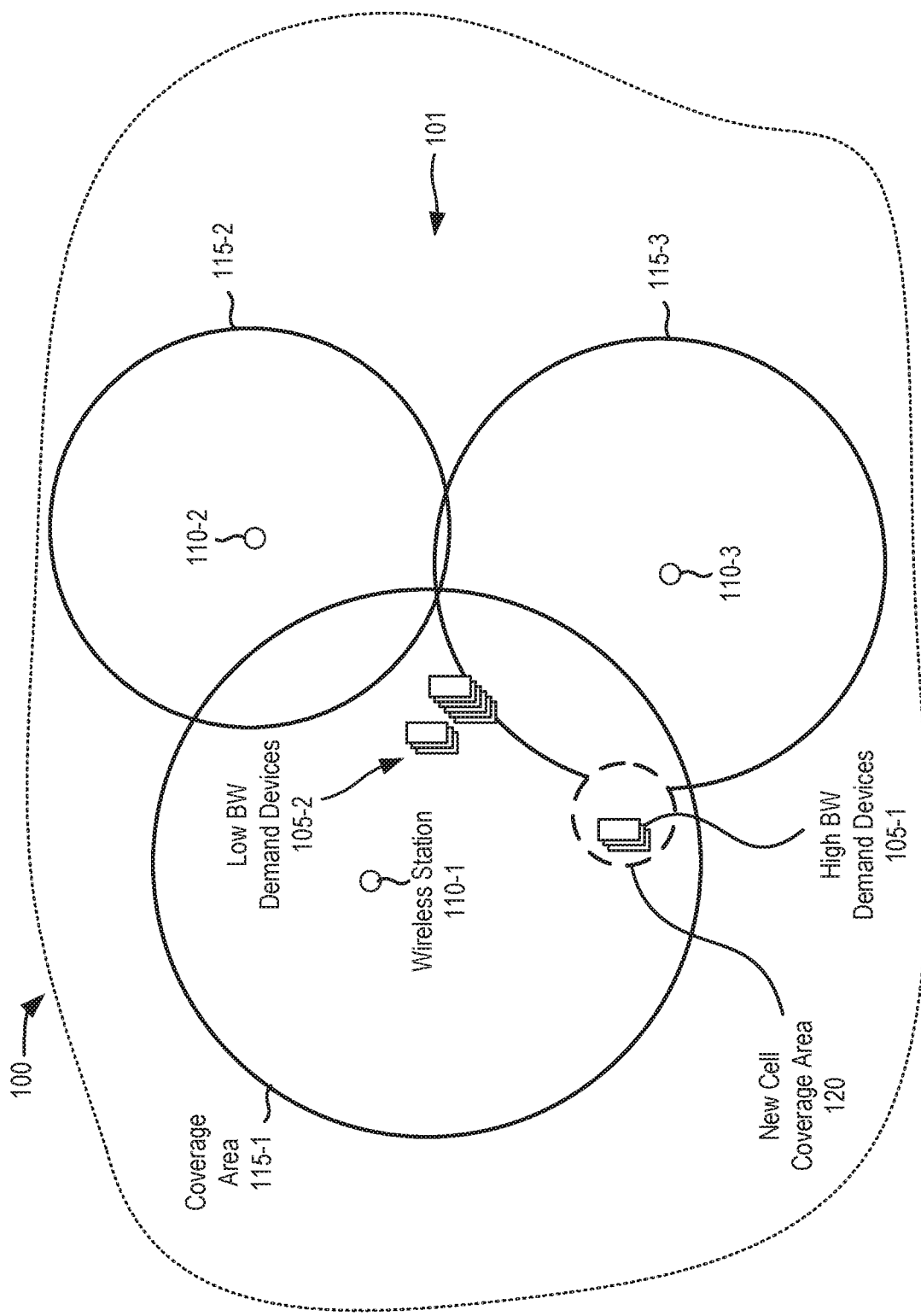
FIG. 1 is a diagram illustrating exemplary coverage areas of a group of wireless stations according to an implementation described herein.

The following detailed description refers to the accompanying drawings. The same reference numbers in different drawings may identify the same or similar elements.

Telecommunications network providers must monitor placement of and tuning of wireless stations in light of changing geographic populations, developing mobile device uses, and shifts in users' mobility/travel patterns. Furthermore, wireless stations require regular maintenance, have recurring rent/lease costs, and incur constant backhaul costs. In addition, wireless stations may occasionally receive upgrades to allow for greater coverage or data bandwidth, according to the needs of the customers served by the sites. Thus, placement of wireless stations is optimally viewed in the context of current demand, future demand, and ongoing lifecycle costs.

Some 5G wireless stations provide comparatively smaller cellular coverage areas than wireless stations using previous wireless standards (e.g., 4G access networks) due to the limited range of higher frequencies (e.g., millimeter wave frequencies) used for 5G access networks. Along with ongoing development of dedicated 5G access coverage, placement of 5G wireless stations (e.g., small cells) may also be used to supplement wider 4G coverage areas (e.g., macro cells) for mobile devices with dual connectivity capabilities. Strategic placement of 5G wireless stations is needed during build out of the 5G network to meet growing customer demands and maximize efficiency.

Implementations described herein relate to optimizing the number and placement of wireless stations based on predicted future capacity and demand scoring of end user devices (referred to herein as user equipment (UE) or mobile devices). The predicted future capacity and demand scoring may be based on a combination of forecasted usage patterns of existing UEs, growth patterns, UEs' heterogeneous application-based peak bandwidth demands over time, and end users' bandwidth impact to the network as a whole. Using machine learning algorithms, a scoring platform may handle multiple inputs simultaneously to optimize the number and placement of wireless stations (e.g., 5G wireless stations) given multiple constraints while best satisfying predicted future demand using the wireless stations' bandwidth capacities.

According to one implementation, systems and methods described herein may determine an optimal number and placement of 5G wireless stations close to "at-risk" network elements (e.g., wireless stations that are near bandwidth capacity) with high end-user demand scores. End-user demand scoring uses different machine learning techniques, like time-series forecasting and/or clustering on UEs' peak bandwidth patterns over time, geospatial data on expected population growth, and UEs' known travel patterns to prioritize at-risk network elements in high-population-growth areas where many bandwidth-straining UEs operate. The systems and methods may dynamically update end-user demand scores and wireless station placement recommendations to account for the addition of new wireless stations or the projected addition of new wireless stations for long-terms planning.

Existing practices for small cell placement may include mobility testing to identify RF coverage and decisions to best place 5G wireless stations where coverage gaps are detected. Other methods may include identifying buildings with large indoor spaces and/or basements where macro cell access points cannot effectively radiate. For capacity related scenarios, adding more macro cells may not be effective as it may add RF interference and, hence, degrade signal quality to UEs. Adding small cells may be a more effective capacity solution than adding additional macro cells, as small cells provide a small coverage area, thereby minimizing RF interference. Currently, small cells are placed ad hoc at perceived high traffic spots to aid in capacity augmentation. Such ad hoc placement may not be an optimal solution, since it involves trial and error and leads to multiple small cells being placed within a macro cell.

FIG. 1 is a diagram illustrating an exemplary geographic area 100 including a group 101 of wireless stations according to an implementation described herein. As shown in FIG. 1, group 101 may include individual cellular wireless stations 110-1 through 110-3 (also referred to herein collectively as wireless stations 110 or individually as wireless station 110) with corresponding RAN coverage areas 115-1 through 115-3 (referred to herein collectively as coverage areas 115 or individually as coverage area 115). In some implementations, wireless stations 110 may correspond to a 4G Long Term Evolution (LTE) eNodeB (eNB) or another type of base station. UEs located within coverage areas 115 may communicate with network devices via wireless stations 110. A service provider may deploy hundreds or thousands of wireless stations 110 in a wireless network. When one or more of wireless stations 110 approach bandwidth capacity (e.g., as measured over time during peak use periods), a 5G wireless station or another small cell may be placed and used to supplement capacity.

In the example of FIG. 1, assume wireless station 110-1 and wireless station 110-3 are identified as high use stations and projected to be "at risk" for approaching bandwidth capacity in the future. Placement of a new 5G wireless station anywhere within a coverage area 115-1 for wireless station 110-1 may accommodate an increasing demand for bandwidth in coverage area 115-1. Similarly, placement of a new 5G wireless station anywhere within a coverage area 115-3 for wireless station 110-3 may reduce the overall bandwidth consumption of wireless station 110-3. Using some projection techniques, the new 5G wireless station may be targeted near an area of high population density (e.g., a new shopping center, apartment complex, etc.). However, simple population/growth projections may not correspond to actual bandwidth demand. For example, a small geographic cluster of user devices 105-1 with high bandwidth consumption may present a higher priority than a larger population cluster of user devices 105-2 with low bandwidth consumption. According to implementations described herein, end-user scoring (along with other factors) may drive optimal placement of 5G wireless stations and account for changing projections over time. For example, times and locations of high bandwidth use can be projected from scores derived from users' activity data, type of use data, and travel patterns to determine an optimal timing and placement of a new 5G cell 120.

Figure 2:
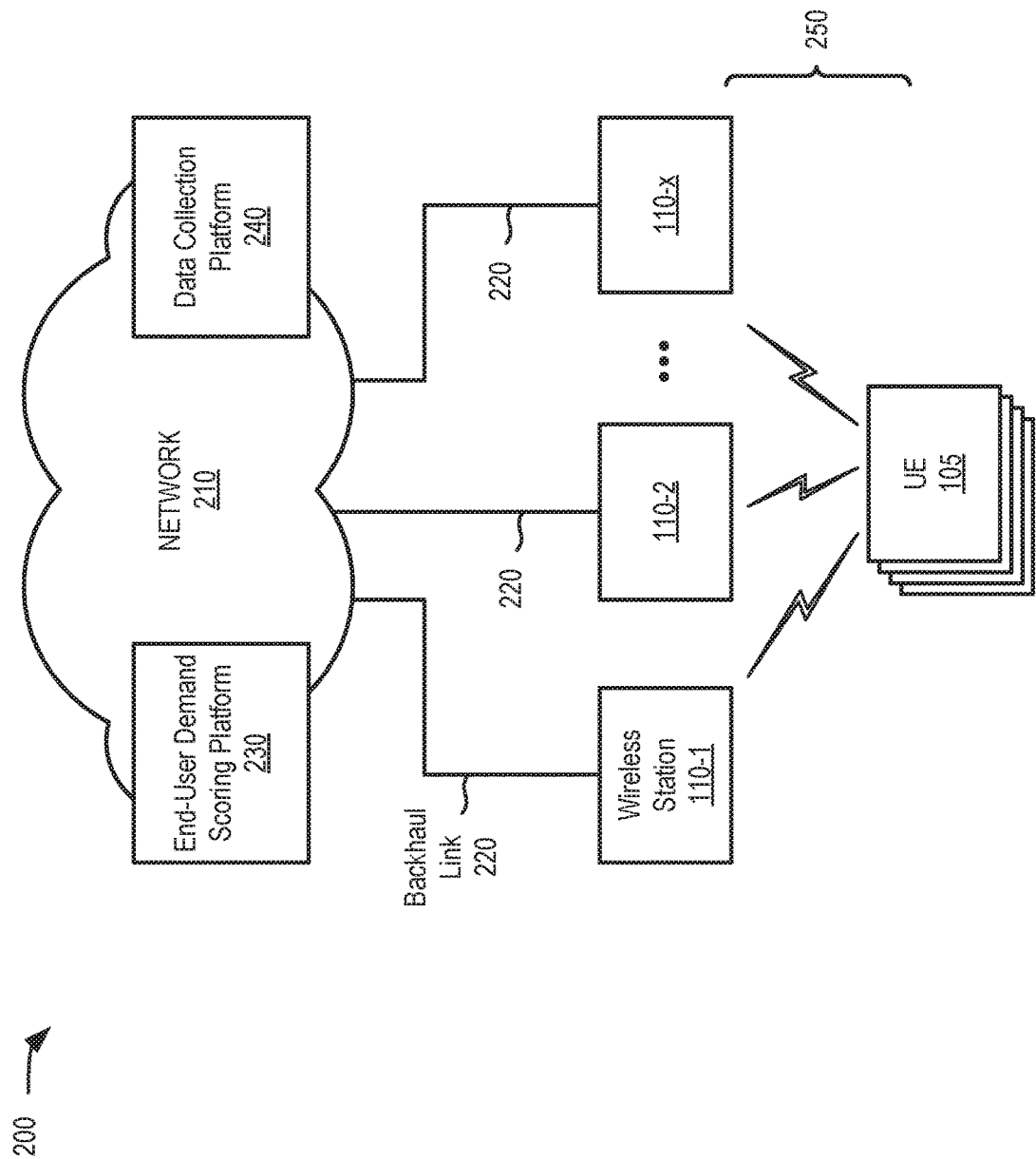
FIG. 2 is a diagram illustrating an exemplary network environment according to an implementation described herein.

FIG. 2 a diagram illustrating an exemplary network environment 200 associated with geographic environment 100 of FIG. 1. As shown in FIG. 2, network environment 200 may include UEs 105, wireless stations 110, a network 210, backhaul links 220 (referred to herein collectively as links 220 or individually as link 220), an end-user demand scoring platform 230, a data collection platform 240, and a RAN 250.

UE 105 may include any mobile communication device configured to communicate with a wireless station via wireless signals. For example, UE 105 may include a portable communication device (e.g., a mobile phone, a smart phone, a GPS device, and/or another type of wireless device); a telephone terminal; a personal computer or workstation; a laptop, tablet, or another type of portable computer; a media playing device; a portable gaming system; a machine-type communication (MTC) device; an Internet-of-Things device; and/or any type of mobile device with wireless communication capability. In one implementation, UE 105 may have multiple coverage mode capabilities, and thus the capability to communicate simultaneously with different wireless stations 110 using different wireless standards.

Wireless station 110 may include a device that handles wireless transmissions to and from UE 105 to provide access to and from network 210. Wireless station 110 may include antennas and related transceiver circuitry for connecting to UE 105. For example, wireless station 110 may include a wireless access station, such as an eNodeB (e.g., an eNB for Third Generation Partnership Project (3GPP) LTE or 4G network standards), a next generation NodeB (e.g., a gNB for 3GPP 5G network standards), a Node B, a base transceiver station (BTS) in a Global System for Mobile Communications (GSM) system, a cell tower, etc. A collection of wireless stations 110 may form RAN 250 to provide for UEs 105 with wireless access to network 210.

In one particular implementation, wireless stations 110 may utilize LTE standards operating frequency bands (e.g., Megahertz frequencies). In other implementations, wireless station 110 may use a higher frequency spectrum (e.g., Gigahertz frequencies such as centimeter wave or millimeter wave, referred to herein collectively as mmWave 5G New Radio) for 5G standards. In contrast with coverage areas (e.g., cell sizes) for lower frequency bands (e.g., Megahertz frequencies, which may cover several miles), coverage areas for mmWave 5G New Radio may be less than a thousand foot radius.

Network 210 may include one or more circuit-switched networks and/or packet-switched networks. For example, network 210 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Wireless stations 110 may connect to network 210 via backhaul links 220. According to one implementation, Network 210 may include a core network that serves as a complementary network for one or multiple RANs 250 described below. For example, network 210 may include the core part of an LTE network, an LTE-A network, a 5G New Radio network, etc. Depending on the implementation, network 210 may include various network elements, such as a gateway, a support node, a serving node, a router, a switch, a bridge, as well other network elements pertaining to various network-related functions, such as billing, security, authentication and authorization, network polices, subscriber profiles, etc.

End-user demand scoring platform 230 (referred to hereafter simply as "scoring platform 230") may include one or more network devices or computing devices. In some implementations, scoring platform 230 may be implemented as a distributed component or a virtual network function. Generally, scoring platform 230 may retrieve (e.g., from data collection platform 240) observed data from subscriber UEs 105 to determine past travel patterns, application-based bandwidth use patterns, device-type implications for bandwidth (e.g., screen size, etc.), and to predict future demand patterns. Scoring platform 230 is described further, for example, in connection with FIGS. 4-6.

Data collection platform 240 may collect UE data from UEs 105, wireless stations 110, and/or other network devices in network 210. In one implementation, data collection platform 240 may gather proprietary network data, such as Per Call Measurement Data (PCMD)-related information, Call Detail Records (CDRs), etc. PCMD, for example, may be used to determine the distance a UE 105 is from a wireless station 110 and, thus, to estimate a UE location. PCMD data may include subscriber and/or UE identifiers associated with one of wireless stations 110, such that bandwidth use and other information associated with a UE 105 may be determined for a particular time (or timeslot) and location. In one implementation, PCMD-related information for each UE 105 may be collected periodically from wireless stations 110 by a mobility management entity (MME), an access and mobility management function (AMF), or another core network function in network 210. Data collection platform 240 may use PCMD data to generate location data and bandwidth use data for UEs 105.

Although FIG. 2 shows exemplary components of network environment 200, in other implementations, network environment 200 may include fewer components, different components, differently-arranged components, or additional components than depicted in FIG. 2. Additionally or alternatively, one or more components of environment 200 may perform functions described as being performed by one or more other components of environment 200.

Figure 3:
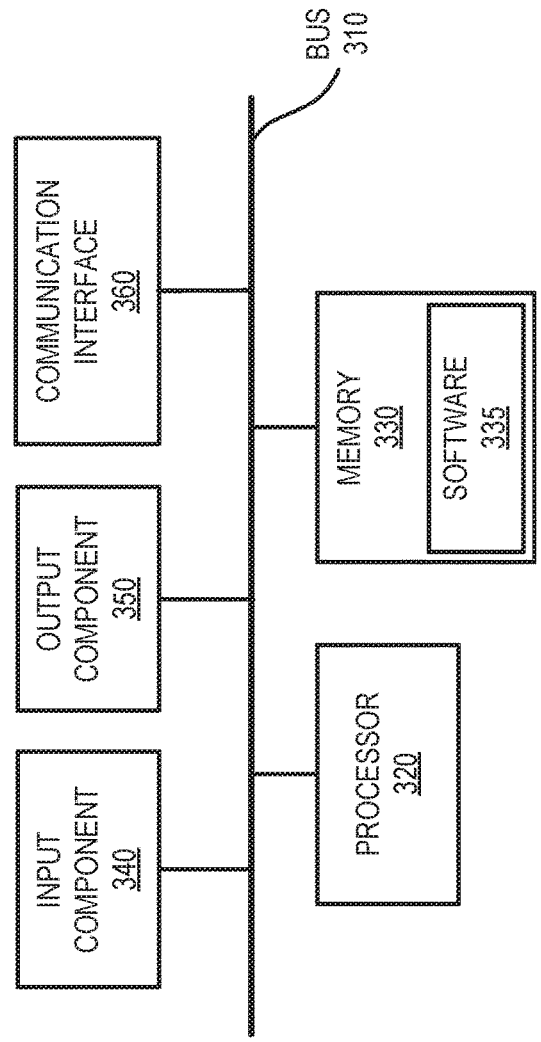
FIG. 3 is a diagram illustrating exemplary components of a device that may be included in the environment of FIG. 2.

FIG. 3 is a diagram illustrating exemplary components of a device 300. Device 300 may correspond, for example, to a component of UE 105, wireless station 110, scoring platform 230, data collection platform 240, or another component of network environment 200. Device 300 may include a bus 310, a processor 320, a memory 330 with software 335, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 may also include firmware, middleware, microcode, hardware description language (HDL), and/or other form of instruction. By way of example, with respect to the network elements that include logic to provide end-user demand scoring, these network elements may be implemented to include software 335. Additionally, for example, UE 105 may include software 335 (e.g., an application to communicate with data collection platform 240, etc.) to perform tasks as described herein.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to UE 105/wireless station 110, and receive RF signals over the air from wireless station 110/UE 105. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
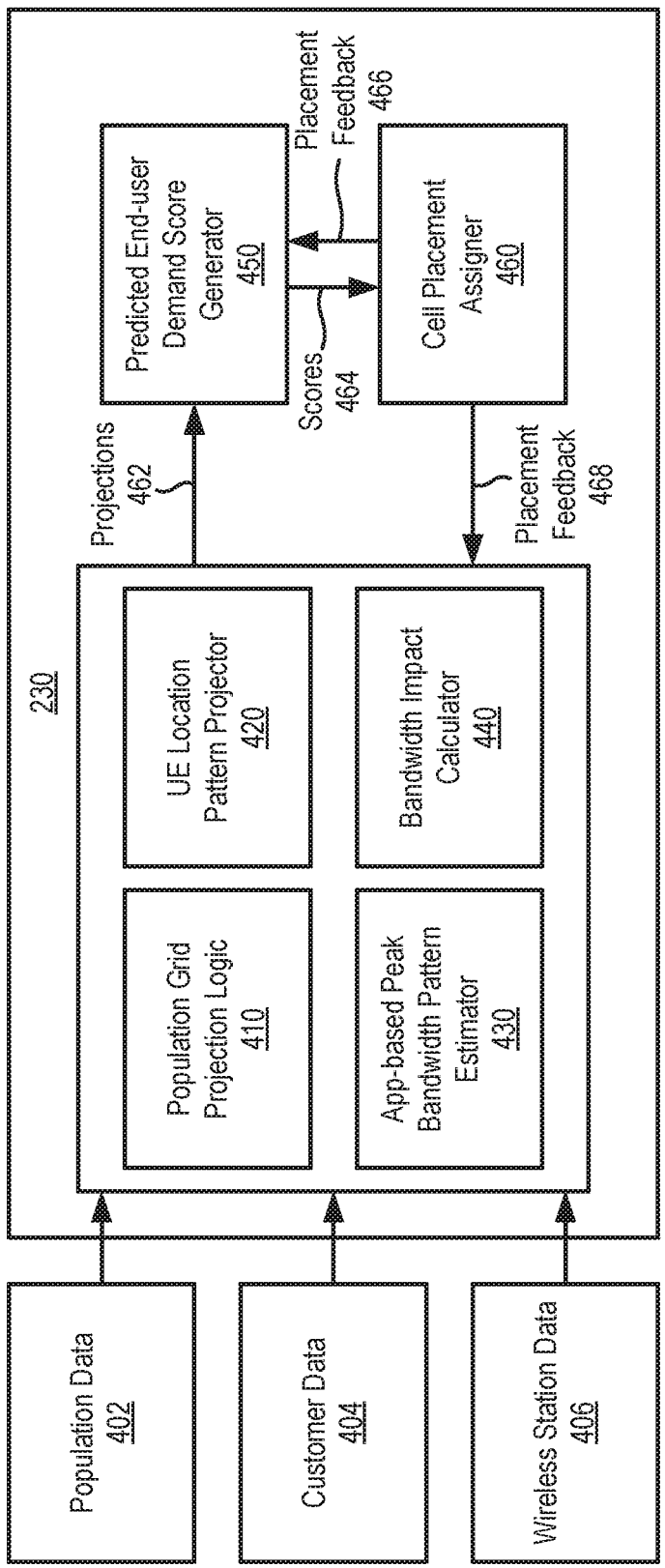
FIG. 4 is a diagram illustrating exemplary logical components of the end-user demand scoring platform of FIG. 2, according to an implementation described herein.

FIG. 4 is a diagram illustrating exemplary logical components of scoring platform 230, according to an implementation described herein. The logical components of scoring platform 230 may be implemented, for example, via processor 320 executing instructions stored in memory 330. As shown in FIG. 4, scoring platform 230 may include population grid projection logic 410, a UE location pattern projector 420, an application-based peak bandwidth pattern estimator 430, and a bandwidth impact calculator 440.

Scoring platform 230 may obtain data from population data 402, customer data 404, and wireless station data 406. In one implementation, some or all of population data 402, customer data 404, and wireless station data 406 may be retrieved from data collection platform 240. Population data 402 may include geospatial population growth data, such as historical and predicted population growth. In one implementation, population data 402 may include census data and projections for cities and metropolitan areas, such as total population growth rates and growth rates of particular demographics. In one implementation, population data 402 may identify particular geographic units, such as census blocks or census tracts.

Customer data 404 may include types of data usage by each UE 105, a service usage profile for each UE, and wireless stations visited. Customer data 404 may be compiled from UE reports, such as PCMD or other feedback (which may include dedicated feedback protocols over designated wireless interfaces). In one implementation, customer data 404 may be compiled in data collection platform 240 and processed by scoring platform 230. In another implementation, data collection platform 240 may perform data processing to convert raw data into particular types of customer data described below.

Types of data usage in customer data 404 may identify, for example, an application, flow, or protocol to differentiate between high data rates and lower data rates used by UE 105. Thus, types of data usage may identify use of applications like streaming video applications, which have high data rates/data volumes and can strongly contribute to a wireless station's congestion versus applications like email, which have low data rates/low data volumes and do not greatly contribute to congestion. In one implementation, types of data usage by a UE 105 may be associated with a time slot (e.g., 15 minutes, 30 minutes, 60 minutes, etc.). A service usage profile in customer data 404 may provide a general indication of whether a user (of UE 105) tends to favor data, voice, messages (e.g., short message service (SMS) messages), or any combinations thereof. Data, voice, and messages represent different forms of services that can be routed to a different part of the wireless backhaul network (network 210) with different associated maintenance/upgrade costs.

Wireless stations visited in customer data 404 may include an indication of all wireless stations at which a UE is connected for a significant time (e.g., above a threshold time). Connection time for a UE 105 may be a cumulative amount of time (e.g., a total time of at least 60 minutes over the course of a day) connected to a wireless station 110 or a single connection time interval (e.g., a consecutive connection of 15 minutes or more).

Wireless station data 406 may include data specific to each wireless station 110, including a maximum bandwidth for the wireless station and headroom for the wireless station. The maximum bandwidth represents the total data bandwidth available from a particular wireless station 110. The headroom represents the amount of data bandwidth unused at the wireless station during a given time of day. In one implementation, headroom may be associated with a time slot, where the time slot headroom is an average or maximum headroom for the time slot. Wireless station data 406 may also include a total number of occupants (e.g., number of active UEs 105 connected to a particular wireless station) for each time slot. In one implementation, the number of occupants may be represented as the average number of occupants (e.g., UEs 105) connected to a wireless station 110 at a given hour (or another time slot interval).

As describe further herein, scoring platform 230 may receive population data 402, customer data 404, and wireless station data 406 and apply machine learning to generate an end-user demand score for particular locations (e.g., census blocks). Although functions of population grid projection logic 410, UE location pattern projector 420, application-based peak bandwidth pattern estimator 430, and bandwidth impact calculator 440 are described separately below, it should be understood population grid projection logic 410, UE location pattern projector 420, application-based peak bandwidth pattern estimator 430, and bandwidth impact calculator 440 may be interdependent.

Population grid projection logic 410 may identify population growth patterns, which may identify historic population patterns (e.g., growth, stability, contraction) based on population data 402 and project population growth areas. In one implementation, machine learning may be used to apply a time series forecast for particular geographic units, such as regions, cities, boroughs, etc., down to the level of census blocks (e.g., the smallest geographic unit used by the United States Census Bureau and which could typically include zero to several hundred people). Population grid projection logic 410 may apply demographic information from census data and/or network customer data to predict a corresponding number of UEs 105 for particular areas in future time periods (e.g., one-year projection, two-year projection, three-year projection, etc.), which may be referred to herein as a population growth projection.

UE location pattern projector 420 may identify travel patterns of UEs 105. For example, billing zip codes for accounts associated with UEs 105 may be associated with zip codes of areas where frequent connections with other wireless stations 110 occur. In another implementation, UE location pattern projector 420 may apply time-based wireless connection data to estimate and predict travel patterns. UE location pattern projector 420 may apply data from population data 402 and customer data 404 to project increased bandwidth demands in areas that may not directly correlate with residential population growth (e.g., workplaces, industrial sites, retail locations, etc.), which may be referred to herein as a visiting projection. Thus, UE location pattern projector 420 may accurately project increased bandwidth demands by the mobile devices in areas outside of a subscriber's residential area.

Application-based peak bandwidth pattern estimator 430 may associate types of data usage by UE devices 105 with particular wireless stations 110 for particular time slots. Identifying types of data usage may enable differentiating between high data volumes and low data volumes. For example, based on customer data 404 and/or wireless station data 406, application-based peak bandwidth pattern estimator 430 may identify existing data use patterns to predict peak-use time slots. Application-based peak bandwidth pattern estimator 430 may predict future data use patterns and peak bandwidth use (referred to herein as application-use projections) based on the existing data patterns (e.g., extrapolated using machine learned algorithms) along with the population growth projections and visiting projections.

Bandwidth impact calculator 440 may identify factors that may impact bandwidth use, such as connection distances and UE device types. Distance of UEs 105 relative to a connected wireless station 110 may impact the amount of signal power/bandwidth needed from a wireless station. For example, assuming the same data consumption, a UE 105 near the far edge of a coverage area (e.g., coverage area 115) may consume more bandwidth from a wireless station 110 than another UE 105 located closer to the wireless station 110 (e.g., due to differences in signal strengths, etc.). In one implementation, bandwidth impact calculator 440 may apply a signal strength factor to compensate for signal strengths (or signal loss) to UEs 105 in geographic units that are farther from a wireless station 110.

Similarly, device types with different screen sizes may consume different bandwidth for the same content (e.g., due to different screen resolution, etc.). Thus, bandwidth impact calculator 440 may identify locations of historical peak data use (e.g., based on triangulation data) and UE device types associated with peak data use. For example, bandwidth impact calculator 440 may determine a probability that a certain type of UE 105 in the geographic unit is a tablet, laptop, or another type of larger-screen device compared to a typical smart phone. In one implementation, bandwidth impact calculator 440 may apply a device type factor to account for a higher probability of high bandwidth consuming devices, such as larger-screen devices. Bandwidth impact calculator 440 may predict future bandwidth impacts by extrapolating the existing bandwidth impact patterns, which may be referred to as network impact projections. In one implementation, a bandwidth impact for a geographic unit may be calculated as a percentage of available capacity of relevant wireless stations at peak time slots.

Predicted end-user demand score generator 450 may obtain results from population grid projection logic 410, UE location pattern projector 420, application-based peak bandwidth pattern estimator 430, and bandwidth impact calculator 440 (shown generically in FIG. 4 as projections 462). According to one implementation, predicted end-user demand score generator 450 may weight and combine the results from projections 462 to generate predicted end-user demand scores 464 for geographic units. Scores may be applied, for example, to geographic units, such as individual census blocks or census tracts (e.g., groups of adjoining census blocks). Predicted end-user demand score generator 450 may identify available bandwidth capacity (e.g., at peak time slots) for wireless stations with coverage areas that include a particular geographic unit to determine an impact of the UEs 105 in the particular geographic unit on the overall capacity of the wireless station. The highest scoring geographic units may indicate geographic locations where predicted user demand will have the most significant bandwidth impact on adjacent wireless stations' capabilities. In one implementation, scores may be calculated for a particular future time period (e.g., one year out, two years out, etc.).

Predicted end-user demand score generator 450 may provide scores 464 to a cell placement assigner 460. Cell placement assigner 460 may identify recommended placement locations for wireless stations, such as a particular census block, census tract, or another geographical unit that may impact bandwidth loads of one or more existing wireless stations 110. In one implementation, the highest-scored census blocks may be targeted for new wireless station installations. In another implementation, cell placement assigner 460 may select installation locations among the highest-scored census blocks based on the predicted end-user demand score along with other constraints, such as coverage area and bandwidth capacity of the new wireless stations, industrial capacity (e.g., limits of labor and materials to install new wireless stations within a certain time period), location/density (e.g., signal interference from adjacent wireless stations), population growth rates, etc. In still other implementations, cell placement assigner 460 may seek to optimize cell placements by combining scores of adjacent geographical units that could be within the coverage area of a single new wireless station.

Planned (and/or actual) wireless station installations in a given time period will affect predicted end-user demand scores of geographic units for future time periods. Thus, cell placement assigner 460 may provide placement feedback 466 indicating projected wireless station installations for a given time period (e.g., a one-year period) to predicted end-user demand score generator 450. Feedback 466 may then be used by predicted end-user demand score generator 450 to dynamically determine end-user demand scores for geographic units in a subsequent time period (e.g., a next one-year period). In another implementation, cell placement assigner 460 may also provide placement feedback 468 to one or more of population grid projection logic 410, UE location pattern projector 420, application-based peak bandwidth pattern estimator 430, and bandwidth impact calculator 440. Feedback 468 may be used for reference purposes to identify the impact, if any, of wireless station distribution on the output of by population grid projection logic 410, UE location pattern projector 420, application-based peak bandwidth pattern estimator 430, or bandwidth impact calculator 440. Thus, feedback 468 may be applied to machine learning algorithms of one or more these logical components.

Although FIG. 4 shows exemplary logical components of scoring platform 230, in other implementations, scoring platform 230 may include fewer logical components, different logical components, or additional logical components than depicted in FIG. 4. Additionally or alternatively, one or more logical components of scoring platform 230 may perform functions described as being performed by one or more other logical components.

FIGS. 5A-5D are illustrations of an exemplary use case for scoring platform 230. As shown in FIGS. 5A-5D, a geographic area 500 may be divided into geographic units 502. Geographic area 500 may represent, for example, an area of projected population growth (e.g., a city, region, borough, etc.) Each geographic unit 502 may correspond, for example, to a census block. Existing wireless stations 110 (not shown in FIGS. 5A-5D) may provide coverage areas 115 over geographic area 500. Coverage areas 115 may include, for example, 4G LTE coverage areas and/or 5G NR coverage areas. New wireless stations 110 may be added to the existing RAN networks in a prioritized manner to provide benefits of new 5G features and to meet increased bandwidth demands due to population growth and increased use of UEs 105.

Figure 5B:
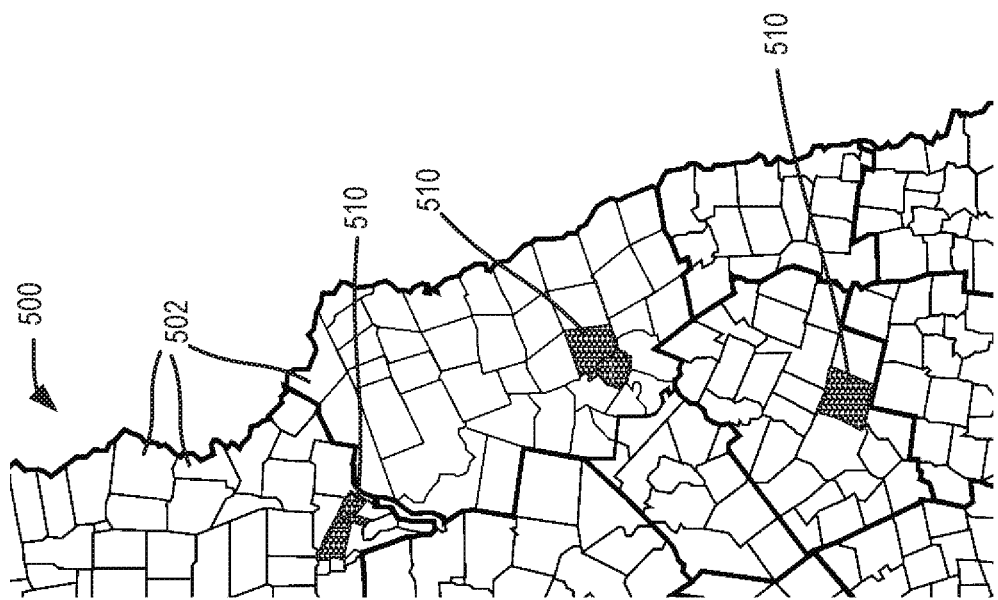
FIGS. 5A-5D are diagrams illustrating an exemplary use case for the end-user demand scoring platform of FIG. 2.
Figure 5A:
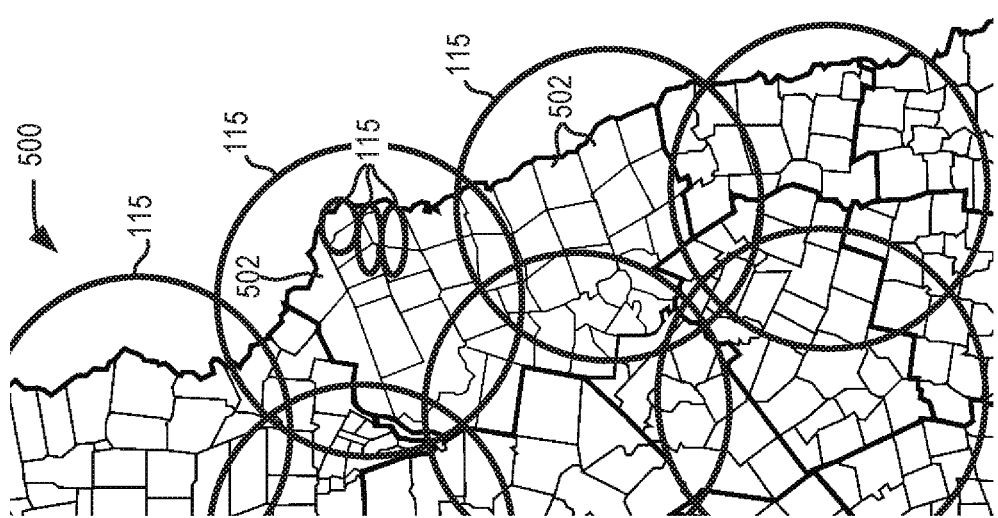

As described above, scoring platform 230 may identify and assign recommended placement locations for new wireless stations 110 (e.g., 5G NR wireless stations) using a combination of projections derived from population data 402, customer data 404, and wireless station data 406. FIG. 5B illustrates wireless station placement locations 510 calculated for a first time period (e.g., projections for a fiscal year, quarter, etc.) to cover future demand. Coverage areas 115 are not shown in FIGS. 5B-5D for clarity. Placement locations 510 may correspond, for example, to a census block or another geographic unit where a new wireless station 110 (e.g., a gNB for a 5G RAN) should be installed within the first time period.

Figure 5D:
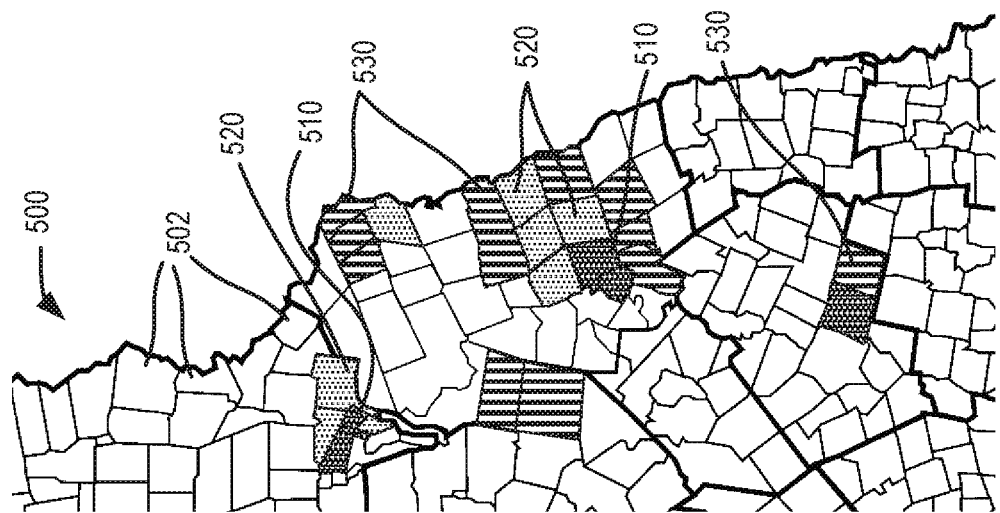
Figure 5C:
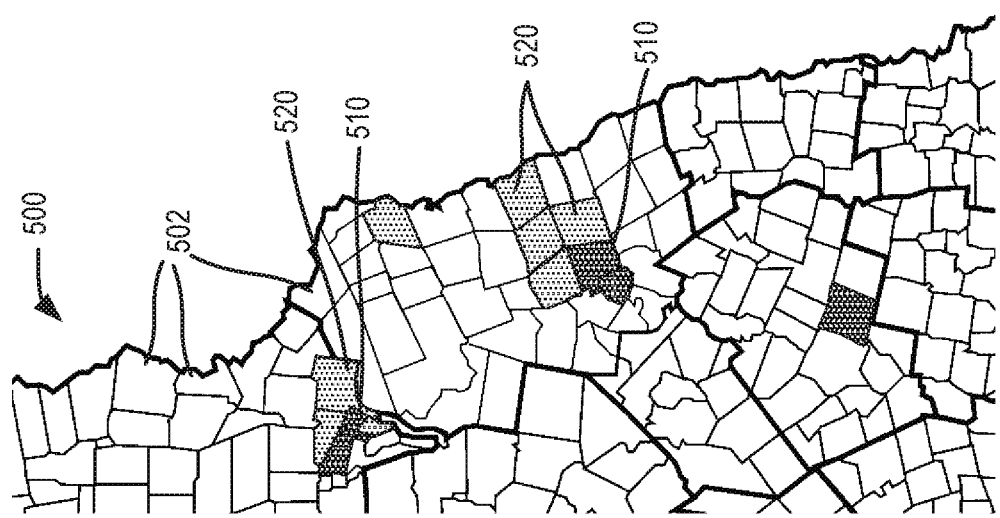

FIG. 5C illustrates placement locations 520 for a second time period (e.g., projections for a second fiscal year, quarter, etc. after the first time period of FIG. 5B). As described above, scoring platform 230 may provide feedback of placement locations 510 from the first time period to dynamically determine predicted end-user demand scores for geographic units in the subsequent time period. Placement locations 520 may, thus, account for the impact of placement locations 510, among other input data.

FIG. 5D illustrates placement locations 530 for a third time period (e.g., projections for a third fiscal year, quarter, etc. after the second time period of FIG. 5C). Scoring platform 230 may provide feedback of placement locations 510 and 520 from the first and second time periods to dynamically determine predicted end-user demand scores for geographic units in the third time period. Placement locations 530 may, thus, account for the impact of placement locations 510 and 520 among other input data.

Although output of placement locations 510, 520, and 530 are shown as a graphical representation in FIGS. 5B-5D, in other implementations output of placement location 510, 520, and 530 may be provided using a list of geographic unit identifiers, geographic coordinates, etc.

Figure 6:
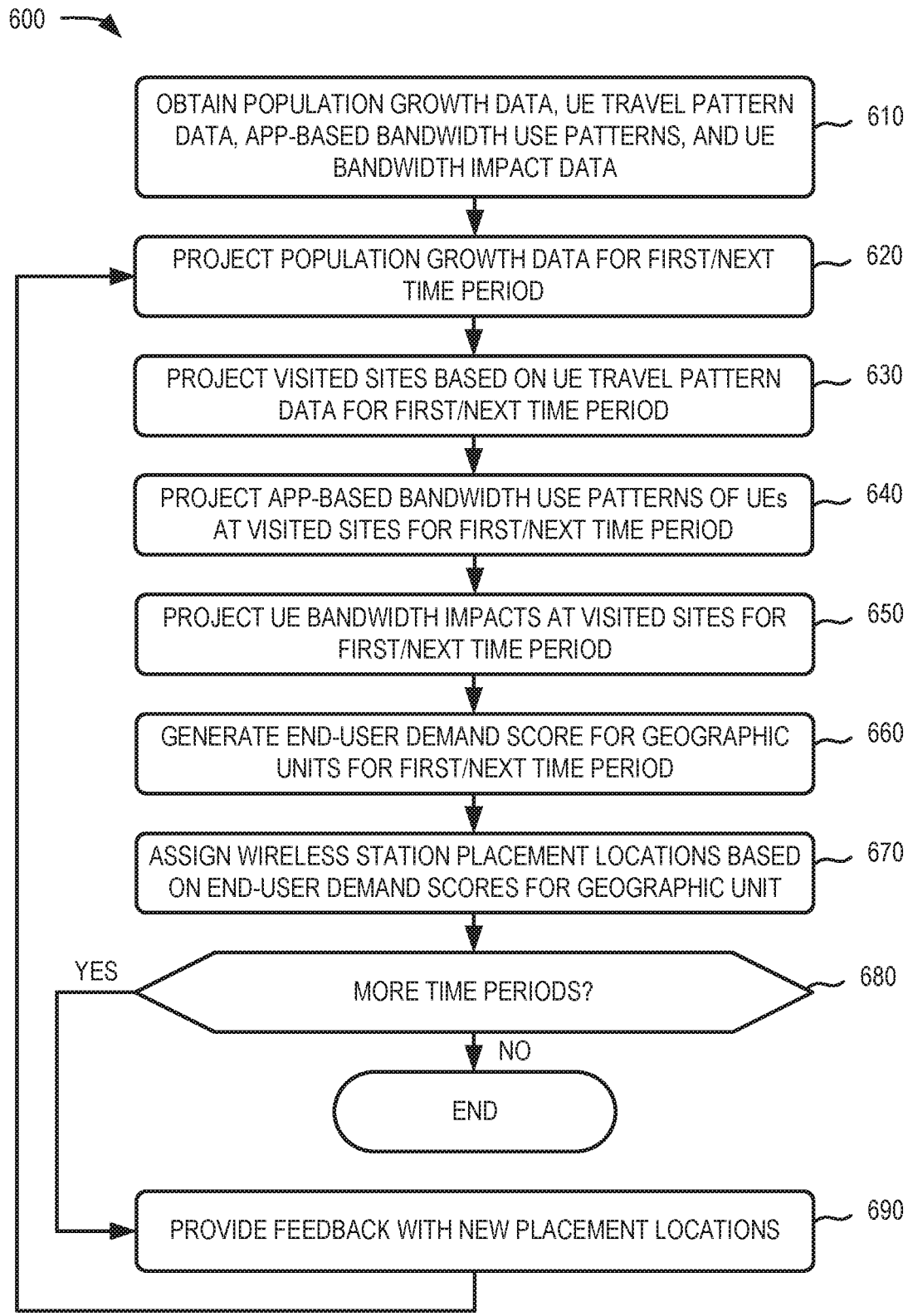
FIG. 6 is a flowchart of an exemplary process for assigning wireless station placements, according to an implementation described herein.

FIG. 6 is a flow diagram illustrating an exemplary process 600 for assigning wireless station placements, according to an implementation described herein. In one implementation, process 600 may be performed by scoring platform 230. In another implementation, some or all of process 600 may be performed by another device or group of devices in network environment 200.

Process 600 may include obtaining population growth data, UE travel pattern data, app-based bandwidth patterns, and UE bandwidth impact data (block 610). For example, scoring platform 230 may be provided with population data 402, customer data 404, and wireless station data 406. Population data 402 may include historical records and growth projections. Customer data 404 and wireless station data 406 may include historical data from network service provider records.

Process 600 may further include projecting population growth data for a time period (block 620). For example, scoring platform 230 (e.g., population grid projection logic 410) may identify population growth patterns, which may identify historic population patterns (e.g., growth, stability, contraction) based on population data 402 and project population growth areas In one implementation, population grid projection logic 410 may also apply demographic information from census data and/or network customer data to predict a corresponding number of UEs 105 (and UE types) for particular areas in future time periods.

Process 600 may additionally include projecting visited sites based on UE travel pattern data for the time period (block 630). For example, scoring platform 230 (e.g., UE location pattern projector 420) may identify travel patterns of UEs 105. UE location pattern projector 420 may apply data from population data 402 and customer data 404 to project increased bandwidth demands in areas that may not directly correlate with residential population growth.

Process 600 may also include projecting application-based bandwidth patterns of users at visited sites for the time period (block 640). For example, scoring platform 230 (e.g., application-based peak bandwidth pattern estimator 430) may associate types of data usage by UE devices 105 with particular wireless stations 110 for particular time slots. Application-based peak bandwidth pattern estimator 430 may predict future data use patterns and peak bandwidth use based on the existing data patterns (e.g., extrapolated using machine learned algorithms), along with the population growth projections and projected location patterns.

Process 600 may further include projecting UE bandwidth impacts at visited sites for the time periods (block 650). For example, scoring platform 230 (e.g., bandwidth impact calculator 440) may identify factors that may impact bandwidth use by UEs 105 at each wireless station, such as distances (e.g., of a connected UE 105 from a wireless station 110) and UE device types. Bandwidth impact calculator 440 may predict future bandwidth impacts by extrapolating the existing bandwidth impact patterns.

Process 600 may additionally include generating end-user demand scores for geographic units for the time period (block 660), and assigning wireless station placement locations based on the end-user demand scores for the geographic units (block 670). For example, scoring platform 230 (e.g., predicted end-user demand score generator 450) may receive results (e.g., projections 462) from population grid projection logic 410, UE location pattern projector 420, application-based peak bandwidth pattern estimator 430, and bandwidth impact calculator 440 and may generate predicted end-user demand scores (e.g., scores 464) for geographic units (e.g., geographic units 502 within a geographic area 500). Based on the assigned scores, scoring platform 230 (e.g., cell placement assigner 460) may identify recommended placement locations for wireless stations, such as a particular census block, census tract, or another geographical unit that may impact bandwidth loads of one or more existing wireless stations 110. According to one implementation, scoring platform 230 may limit the amount of the assigned geographic units based on an industrial capacity (or installation capacity) of a service provider for the time period (such as a calendar year, quarter, or month).

Process 600 may include determining if there are more time periods to score (block 680). For example, a user of scoring platform 230 may select one or more time periods for projecting wireless station placement, such as multiple months, quarters, years, etc. Projections may be repeated iteratively for each time period, accounting for projected new wireless stations in intervening time periods. Thus, if there are more time periods to score (block 680—yes), process 600 may include providing feedback with new placement locations (block 690). For example, cell placement assigner 460 may feed wireless station placement location 510 data back to one or more of population grid projection logic 410, UE location pattern projector 420, application-based peak bandwidth pattern estimator 430, and bandwidth impact calculator 440 (e.g., as feedback 468) and/or predicted end-user demand score generator 450 (e.g., as feedback 466) to project coverage areas and bandwidths associated with new wireless stations. Process 600 may then return to process block 620 to project population growth data for the next time period. If there are no more time periods to score (block 680—no), process 600 may end.

Systems and methods described herein may generate a demand score for one or more geographic units within a geographic region for a time period, wherein the demand score reflects a population growth projection, a visiting projection, an application-use projection, and a network impact projection. The systems and methods may assign, based on the demand score, one or more of the geographic units as placement locations for new wireless stations during the time period. According to an implementation described herein, a computing device may calculate a population growth projection of mobile devices in a geographic region for a time period; may calculate a visiting projection for a peak amount of mobile devices connected to wireless stations in the geographic area and locations of the mobile devices when connected to wireless stations within the time period; may calculate an application-use projection for application-based bandwidth use patterns of the mobile devices within the time period; and may calculate a network impact projection for an amount bandwidth impact by the mobile devices at each of the wireless stations. The computing device may generate a demand score for one or more geographic units within the geographic region. The demand score reflects the population growth projection, the visiting projection, the application-use projection, and the network impact projection. The computing device may assign, based on the demand score, one or more of the geographic units as placement locations for new wireless station during the time period.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A computing device, comprising:
   an interface that communicates with a network;
   a memory configured to store instructions; and
   a processor, coupled to the interface and the memory, wherein the processor is configured to execute the instructions stored in the memory to:
   receive, via the interface, network use data for a telecommunications network and population growth data for a geographic region,
   apply machine learning to derive, based on the network use data and the population growth data, and for one or more geographic units within the geographic region and for a future time period,
   a user equipment (UE) population growth projection,
   a visiting UE projection,
   an application-use projection indicating application-based bandwidth use patterns of the mobile devices within the future time period, and
   a network impact projection based on the network use data,
   generate a demand score for one or more geographic units within the geographic region for the future time period, wherein the demand score reflects the UE population growth projection, the visiting UE projection, the application-use projection, and the network impact projection, and
   assign, based on the demand score, one or more of the geographic units as placement locations for new wireless stations during the future time period.

2. The computing device of claim 1, wherein, when applying the machine learning to derive, the processor is further configured to:
   calculate the UE population growth projection to project a number of mobile devices in the geographic region for the future time period,
   calculate the visiting UE projection to project a peak number of mobile devices connected to wireless stations in the geographic region and locations of the mobile devices when connected to wireless stations within the future time period, and
   calculate a network impact projection to project an amount of bandwidth impact by the mobile devices at each of the wireless stations.

3. The computing device of claim 2, wherein the network data includes proprietary data of one or more of Per Call Measurement Data (PCMD) or Call Detail Records (CDRs).

4. The computing device of claim 2, wherein, when calculating the visiting UE projection, the processor is further configured to:
   project, based on the network data, increased bandwidth demands by the mobile devices in areas outside of a subscriber's residential area.

5. The computing device of claim 2, wherein, when calculating the application-use projection, the processor is further configured to:
   associate types of data usage by mobile devices with particular wireless stations for particular time slots, wherein the types of data usage differentiate between high data volumes and low data volumes.

6. The computing device of claim 2, wherein, when calculating the network impact projection, the processor is further configured to:
   determine a distance between a mobile device and one of the wireless stations to which the mobile device has a projected wireless connection, and
   apply a signal strength factor to compensate for signal strength based on the distance.

7. The computing device of claim 2, wherein, when calculating the network impact projection, the processor is further configured to:
   determine a probability of a type of the mobile device in the geographic unit, and
   apply a device type factor to compensate for bandwidth demands for the mobile device based on the probability.

8. The computing device of claim 2, wherein the processor is further configured to:
   project updated coverage areas for new wireless station installations at the placement locations, and
   generate, based on the updated coverage areas, a new demand score for one or more geographic units within the geographic region.

9. The computing device of claim 1, wherein, when generating the demand score for the one or more geographic units, the processor is further configured to:
   use a previously defined area block as the geographic unit.

10. The computing device of claim 1, wherein, when assigning the one or more of the geographic units, the processor is further configured to:
   limit the amount of the assigned geographic units based on an industrial capacity of a service provider for the future time period.

11. A method, comprising:
   receiving, by a computing device, network use data for a telecommunications network and population growth data for a geographic region;
   applying, by the computing device, machine learning to derive, based on the network use data and the population growth data, and for one or more geographic units within the geographic region and for a future time period:
      a user equipment (UE) population growth projection,
      a visiting UE projection,
      an application-use projection indicating application-based bandwidth use patterns of the mobile devices within the future time period, and
      a network impact projection based on the network use data;
   generating, by the computing device, a demand score for one or more geographic units within the geographic region for the future time period, wherein the demand score reflects the UE population growth projection, the visiting UE projection, the application-use projection, and the network impact projection; and
   assigning, by the computing device and based on the demand score, one or more of the geographic units as placement locations for new wireless stations during the future time period.

12. The method of claim 11, wherein applying the machine learning to derive, further comprises:
   calculating, by the computing device, the population growth projection of mobile devices in a geographic region for the time period;
   calculating, by the computing device, the visiting UE projection for a peak number of mobile devices connected to wireless stations in the geographic region and locations of the mobile devices when connected to wireless stations within the time period; and
   calculating, by the computing device, the network impact projection for an amount of bandwidth impact by the mobile devices at each of the wireless stations.

13. The method of claim 12, wherein the network data includes proprietary data of one or more of Per Call Measurement Data (PCMD) or Call Detail Records (CDRs).

14. The method of claim 12, wherein calculating the visiting UE projection further comprises:
   projecting, based on travel patterns derived from the network data, increased bandwidth demands by the mobile devices in areas outside of a subscriber's residential area.

15. The method of claim 11, wherein generating the demand score for the one or more geographic units further comprises:
   using existing census blocks as the one or more geographic units.

16. The method of claim 11, further comprising:
   projecting updated coverage areas for new wireless station installations at the placement locations, and
   generating, based on the updated coverage areas, a new demand score for one or more geographic units within the geographic region.

17. The method of claim 11, wherein assigning the one or more of the geographic units further comprises:
   limiting the amount of the assigned geographic units based on an industrial capacity of a service provider for the time period.

18. A non-transitory computer-readable medium containing instructions executable by at least one processor, the computer-readable medium comprising one or more instructions to:
   receive, via a communications interface, network use data for a telecommunications network and population growth data for a geographic region;
   apply machine learning to derive, based on the network use data and the population growth data, and for one or more geographic units within the geographic region and for a future time period:
      a user equipment (UE) population growth projection,
      a visiting UE projection,
      an application-use projection indicating application-based bandwidth use patterns of the mobile devices within the future time period, and
      a network impact projection based on the network use data;
   generate a demand score for one or more geographic units within the geographic region for the future time period, wherein the demand score reflects the UE population growth projection, the visiting UE projection, the application-use projection, and the network impact projection; and
   assign, based on the demand score, one or more of the geographic units as placement locations for new wireless stations during the future time period.

19. The non-transitory computer-readable medium of claim 18, further comprising instructions to:
   project updated coverage areas for new wireless station installations at the placement locations; and
   generate, based on the updated coverage areas, a new demand score for one or more geographic units within the geographic region.

20. The non-transitory computer-readable medium of claim 19, further comprising instructions to:
   assign, based on the new demand score, another one or more of the geographic units as placement locations for new wireless station during a subsequent time period.

* * * * *